F. M. ROESSING.
MANDREL FOR MAKING INNER TUBES.
APPLICATION FILED MAR. 28, 1921.
1,396,145.
Patented Nov. 8, 1921.
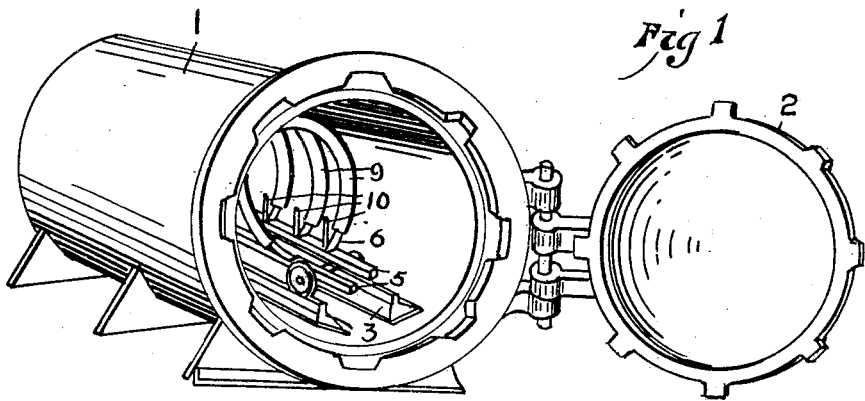
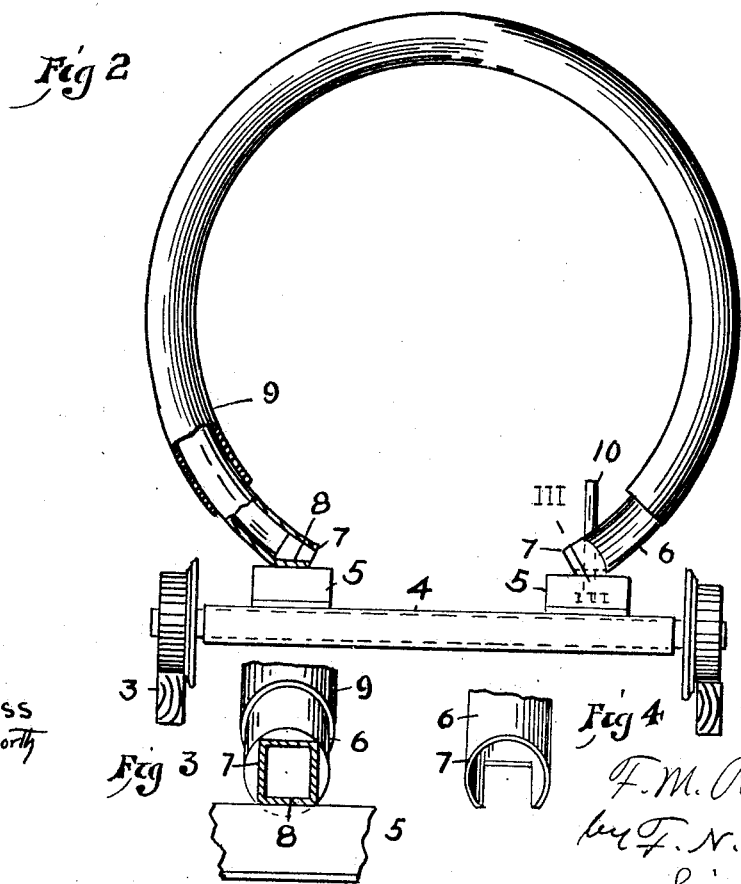
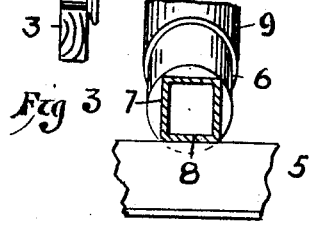

UNITED STATES PATENT OFFICE.

FRANK M. ROESSING, OF SHARPSBURG, PENNSYLVANIA.

MANDREL FOR MAKING INNER TUBES.

1,396,145.  Specification of Letters Patent.  Patented Nov. 8, 1921.

Application filed March 28, 1921. Serial No. 456,051.

*To all whom it may concern:*

Be it known that I, FRANK M. ROESSING, a citizen of the United States, residing at Sharpsburg, in the county of Allegheny and State of Pennsylvania, have invented new and useful Improvements in Mandrels for Making Inner Tubes, of which the following is a specification.

My invention relates to mandrels for making inner tubes for automobile tires.

It is one of the objects of the present invention to provide a nearly circular mandrel which will stand in a vertical plane on a vulcanizing truck without the employment of any adjuncts to support it laterally. My invention also relates to the combination of such a mandrel with a vulcanizing truck or device adapted to so support the mandrel that it may stand in a vertical plane.

Referring to the accompanying drawing, Figure 1 is a perspective view of a vulcanizer with a track and a truck, on the latter of which a few mandrels are seated; Fig. 2, an end elevation of the truck showing thereon a mandrel in side elevation; Fig. 3, a section of the mandrel on the line III—III of Fig. 2; and Fig. 4, a cross-section showing a modified mandrel.

On the drawing, 1 designates a horizontal steel vulcanizer. It is circular in cross-section and has the cylindrical body 1 and the door 2 for closing the front end thereof. On the bottom of the body 1 is a track having the rails 3 running lengthwise of the body. The truck or car 4 travels on the said track and is moved into the vulcanizer on rails (not shown), placed temporarily at the ends of the rails 3. The truck has thereon a pair of mandrel supports 5 extending lengthwise of the truck. These supports have their upper faces horizontal.

6 represents my improved mandrel which is composed preferably of seamless drawn steel tubing bent on a circular arc with its ends 7 spaced apart and resting on the supports 5. In order that the mandrel will stand unaided upon the said supports 5 I flatten preferably both ends of the mandrel on their lower sides as shown at 8, so that they will rest squarely on the supports in a vertical position. I have shown the meeting plane of the supports and the mandrel ends horizontal, but it is only necessary that they have broad meeting surfaces which will cause the mandrel to stand vertical without outside aid. Preferably both ends of the mandrel are made to match the upper surface of the supports 5. This may be done by cutting away the lower sides of the ends 7 as shown on Fig. 4 or by merely flattening them as shown on Fig. 3. The supports 5 may of course be one continuous support. The circumferential flattened portions 8 of the ends 7 are at right angles to a plane cutting the axial center line of the mandrel at right angles.

The inner tubes are threaded on the mandrels, as shown at 9 on Fig. 2, and placed crosswise on the truck, being spaced apart by the pins 10 in one of the supports 5.

I claim:

1. A vulcanizing truck having a mandrel-supporting surface, and an arc-shaped mandrel forming approximately a circle and having the circumferential surface at its ends resting on the said surface, the said surfaces being shaped to support the mandrel in a vertical plane.

2. A vulcanizing truck having a horizontal mandrel-supporting surface, and an arc-shaped mandrel forming approximately a circle and having the circumferential surface at one end at right angles to a plane cutting the axial center line of the mandrel at right angles, the last named surface resting upon the first named surface.

3. A vulcanizing truck having a mandrel-supporting surface, and an arc-shaped mandrel forming approximately a circle and having the circumferential surface at its ends resting on the said surface, the said surface at one of the ends of the mandrel being shaped so as to maintain alone the mandrel in a vertical plane.

4. A mandrel for making inner tubes for pneumatic tires comprising an arc-shaped body forming approximately a circle and having the circumferential surface at one of its ends lying in a plane at right angles to a plane cutting the axial center line of the body at right angles.

5. A mandrel for making inner tubes for pneumatic tires comprising an arc-shaped body forming approximately a circle and having the circumferential surface at its ends shaped to fit a support and maintain it by said shape alone in a vertical position.

Signed at Pittsburgh, Pa., this 22nd day of March, 1921.

FRANK M. ROESSING.